United States Patent
Kapil et al.

(10) Patent No.: US 9,400,821 B2
(45) Date of Patent: Jul. 26, 2016

(54) MEMORY BUS PROTOCOL TO ENABLE CLUSTERING BETWEEN NODES OF DISTINCT PHYSICAL DOMAIN ADDRESS SPACES

(71) Applicant: Oracle International Corporation, Redwood Shores, CA (US)

(72) Inventors: Sanjiv Kapil, Cupertino, CA (US); Zoran Radovic, Alvsjo (SE)

(73) Assignee: Oracle International Corporation, Redwood Shores, CA (US)

( * ) Notice: Subject to any disclaimer, the term of this patent is extended or adjusted under 35 U.S.C. 154(b) by 649 days.

(21) Appl. No.: 13/838,542

(22) Filed: Mar. 15, 2013

(65) Prior Publication Data

US 2014/0095651 A1  Apr. 3, 2014

Related U.S. Application Data

(60) Provisional application No. 61/709,142, filed on Oct. 2, 2012.

(51) Int. Cl.
*G06F 15/173* (2006.01)
*G06F 17/30* (2006.01)
(Continued)

(52) U.S. Cl.
CPC ........ *G06F 17/30442* (2013.01); *G06F 9/3851* (2013.01); *G06F 9/3867* (2013.01);
(Continued)

(58) Field of Classification Search
CPC ................. G06F 17/30501; G06F 17/30442; G06F 17/30483; G06F 9/546; G06F 9/3867; G06F 12/0804; G06F 12/12; G06F 15/17331; G06F 12/082; G06F 12/1408; G06F 17/30498; G06F 17/30595; G06F 21/6209; H04L 69/14
See application file for complete search history.

(56) References Cited

U.S. PATENT DOCUMENTS

| | | | |
|---|---|---|---|
| 4,817,140 A | 3/1989 | Chandra | |
| 5,133,053 A * | 7/1992 | Johnson | H04L 29/00 709/223 |

(Continued)

FOREIGN PATENT DOCUMENTS

| | | |
|---|---|---|
| EP | 2 423 843 A1 | 2/2012 |
| WO | WO 02/19115 A2 | 3/2002 |
| WO | WO 02/078254 | 10/2002 |

OTHER PUBLICATIONS

Ming et al., "An Efficient Attribute Based Encryption Scheme with Revocation for Outsourced Data Sharing Control", dated 2011, 6 pages.

(Continued)

*Primary Examiner* — Farid Homayounmehr
*Assistant Examiner* — Sanchit Sarker
(74) *Attorney, Agent, or Firm* — Hickman Palermo Becker Bingham LLP

(57) ABSTRACT

A system and method for transferring data and messages between nodes in a cluster is disclosed. Each node in the cluster is a separate physical domain but is connected to other nodes in the cluster through point-to-point high speed links. Each side of a link is coupled to a coprocessor which facilitates the movement of data between and among the nodes. Because each physical domain is separate from any other domain, the coprocessor in a physical domain uses a certificate, called and RKey, to obtain permission to transfer data to another physical domain. When an RKey is received from another physical domain, the coprocessor in the receiving domain validates the key and obtains the physical addresses associated with the key so that it can provide or accept the remote data. Data transfers between pairs of remote nodes in the cluster are permitted as well.

17 Claims, 10 Drawing Sheets

(51) Int. Cl.

| | | |
|---|---|---|
| *G06F 9/54* | (2006.01) | |
| *G06F 9/38* | (2006.01) | |
| *G06F 12/08* | (2016.01) | |
| *G06F 12/12* | (2016.01) | |
| *G06F 12/14* | (2006.01) | |
| *G06F 21/62* | (2013.01) | |
| *H04L 29/06* | (2006.01) | |
| *G06F 15/78* | (2006.01) | |

(52) U.S. Cl.
CPC ............ *G06F 9/546* (2013.01); *G06F 12/082* (2013.01); *G06F 12/0804* (2013.01); *G06F 12/12* (2013.01); *G06F 12/1408* (2013.01); *G06F 12/1475* (2013.01); *G06F 15/17331* (2013.01); *G06F 15/7889* (2013.01); *G06F 17/30324* (2013.01); *G06F 17/30483* (2013.01); *G06F 17/30495* (2013.01); *G06F 17/30498* (2013.01); *G06F 17/30501* (2013.01); *G06F 17/30519* (2013.01); *G06F 17/30578* (2013.01); *G06F 17/30595* (2013.01); *G06F 17/30867* (2013.01); *G06F 21/6209* (2013.01); *H04L 69/14* (2013.01); *Y02B 60/188* (2013.01)

(56) References Cited

U.S. PATENT DOCUMENTS

| | | | | |
|---|---|---|---|---|
| 6,175,566 | B1* | 1/2001 | Hahn | H04L 12/18 370/389 |
| 6,757,790 | B2* | 6/2004 | Chalmer | G06F 3/0601 709/212 |
| 7,218,643 | B1* | 5/2007 | Saito | H04H 20/02 370/395.52 |
| 8,255,922 | B1* | 8/2012 | Fresko | G06F 9/544 709/213 |
| 9,052,936 | B1* | 6/2015 | Aron | G06F 9/45533 |
| 9,083,614 | B2* | 7/2015 | Falco | H04L 43/0811 |
| 2002/0191599 | A1* | 12/2002 | Parthasarathy | G06F 9/3004 370/389 |
| 2003/0061417 | A1* | 3/2003 | Craddock | G06F 9/546 710/54 |
| 2003/0105914 | A1* | 6/2003 | Dearth | G06F 12/1072 711/6 |
| 2006/0095690 | A1* | 5/2006 | Craddock | G06F 12/1475 711/153 |
| 2006/0098649 | A1 | 5/2006 | Shay | |
| 2009/0037571 | A1* | 2/2009 | Bozak | G06F 11/3006 709/224 |
| 2012/0011398 | A1* | 1/2012 | Eckhardt | G06F 11/2028 714/15 |
| 2013/0013843 | A1* | 1/2013 | Radovic | G06F 11/073 711/5 |
| 2013/0036332 | A1* | 2/2013 | Gove | G06F 21/52 714/54 |
| 2014/0095651 | A1* | 4/2014 | Kapil | G06F 17/30501 709/216 |
| 2014/0095805 | A1* | 4/2014 | Kapil | G06F 17/30501 711/145 |
| 2014/0181454 | A1* | 6/2014 | Manula | G06F 12/0223 711/170 |
| 2014/0229440 | A1* | 8/2014 | Venkatesh | G06F 17/30174 707/634 |
| 2015/0278103 | A1 | 10/2015 | Radovic et al. | |

OTHER PUBLICATIONS

Wang et al., "HyperSafe: A Lightweight Approach to Provide Lifetime hypervisor Control-Flow Integrity" IEEE, dated 2010, 16 pages.
Yu et al., "Attribute Based Data Sharing with Attribute Revocation" dated Apr. 13-16, 2010, ASIACCS, 10 pages.
Wang et al., "Hierarchical Attribute-based Encryption and Scalable User Revocation for Sharing Data in Cloud Servers", 2011, 12 pages.
Zhang, Long, "Attribute Based Encryption Made Practical", dated Apr. 2012, 62 pages.
Franke et al., "Introduction to the wire-speed processor and architecture" IBM J. RES & DEV. vol. 54 No. 1 Paper 3, dated Jan. 2010, 12 pages.
Gao et al., "Application-Transparent Checkpoint/Restart for MPI Programs over InfiniBand", dated 2006, 8 pages.
Lee et al., "A Comprehensive Framework for Enhancing Security in InfiniBand Architecture", IEEE, vol. 18 No. 10, Oct. 2007, 14 pages.

* cited by examiner

US 9,400,821 B2

MEMORY BUS PROTOCOL TO ENABLE CLUSTERING BETWEEN NODES OF DISTINCT PHYSICAL DOMAIN ADDRESS SPACES

CROSS-REFERENCE TO RELATED APPLICATIONS; PRIORITY CLAIM

This application claims priority to U.S. Application 61/709,142, filed on Oct. 2, 2012, and titled "TECHNIQUES FOR ACCELERATING DATABASE OPERATIONS", the entire contents of which are incorporated by reference as if fully set forth herein and for all purposes.

This application incorporates by reference the entire contents of U.S. application Ser. No. 13/839,525, titled "REMOTE-KEY BASED MEMORY BUFFER ACCESS CONTROL MECHANISM", filed on equal day herewith, as if fully set forth herein and for all purposes.

FIELD OF INVENTION

The present invention relates generally to a coprocessor for improving internode communications in a cluster and more particularly to a coprocessor that handles a link-to-link protocol for improving internode communications.

BACKGROUND

Individual processing systems have greatly increased in performance. However, still greater performance is attainable by clusters of processing systems or nodes. A key factor in attaining high performance clusters is communication among the nodes. FIG. 1 depicts one early technique in which, the processing nodes 102, 104, 106, each with its own CPU 108a-c and local memory 110a-c, were coupled via interfaces 112a-c to each other by a common bus 110. Each node 102, 104, 106 was allowed to access the other nodes' memory, such that the processing nodes could be viewed as sharing one large memory. One drawback of this shared bus architecture was that the bus quickly became a performance limiting element, because all of the internode communications queued up, competing for the use of the bus. Once the bus 110 became saturated or nearly saturated, adding additional nodes provided very little improvement.

Recognizing the disadvantages of the shared bus architecture, another technique, depicted in FIG. 2, is employed. In FIG. 2, nodes 202, 204, 206, 208, 210, in the cluster comprising CPUs 216a-e and memories 218a-e, are interconnected by dedicated high-speed point-to-point communications links 220a-j. If enough point-to-point connections 220a-j are used, creating a fabric of links, higher performance is achieved, because there is no shared bus contention. However, the point-to-point communications links 220a-j adhere to a complex, layered communications protocol to guarantee correctness and robustness of the communication. The architecture requires that I/O processors in the interfaces 214a-t carry out this complex protocol as well as translate and validate the source and destination addresses. Performing these communications tasks lowers performance because the I/O processors are generally much slower than the main. CPU in carrying out the protocols and address translation and because the coupling between the interface and the respective node's memory was poor. Thus, while higher performance was achieved in the cluster, the communications overhead and poor coupling causes performance gain to reach an upper limit.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An embodiment provides internode communication in a cluster that has very low overhead and permits direct memory-to-memory communication among the nodes, each residing in a separate physical address space. The embodiment improves both communication latency and bandwidth and provides hardware authenticated access among the physical address spaces and error checking. The embodiment increases performance of the cluster, permitting it to act much more like a single system. The embodiment also permits a higher number of nodes because the performance scales with the number of nodes.

The embodiment makes it possible to incorporate high speed non-volatile memory, such as PCM (phase-change memory) or NVRAM, local to the node and to share the memory in a distributed cluster environment at high bandwidth.

One embodiment is a computer system that includes a plurality of computing nodes and a plurality of point-to-point physical communications links. Each of the computing nodes of the plurality of computing nodes includes a coprocessor and a memory coupled to the coprocessor, where each memory resides in a separate and distinct physical domain. One or more communications links of the plurality of links is coupled between each pair of nodes in the plurality of nodes, where each coprocessor in a node is coupled to the one or more communications links to transfer data over the at least one communications link. Each coprocessor is configured to transfer data between the memory coupled to the coprocessor and the memory of another node to which the coprocessor is coupled by the one or more communications link using a certificate that grants access to a portion of the memory in the other node, or to transfer data between two other nodes in the cluster to which the coprocessor is coupled by the one or more communications links using a first certificate that grants access rights to a portion of memory in the first of the two other nodes and a second certificate that grants access rights to a portion of memory in the second of the two other nodes.

DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
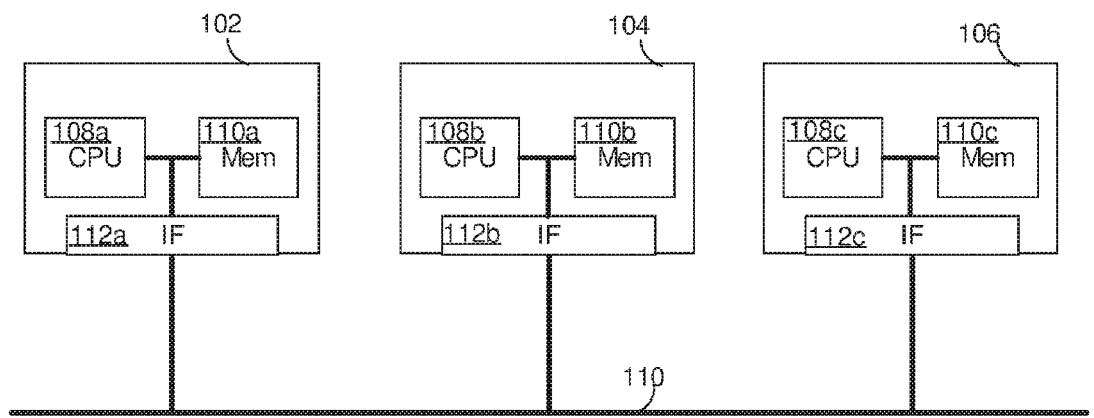
FIG. 1 depicts a shared bus architecture.
Figure 2:
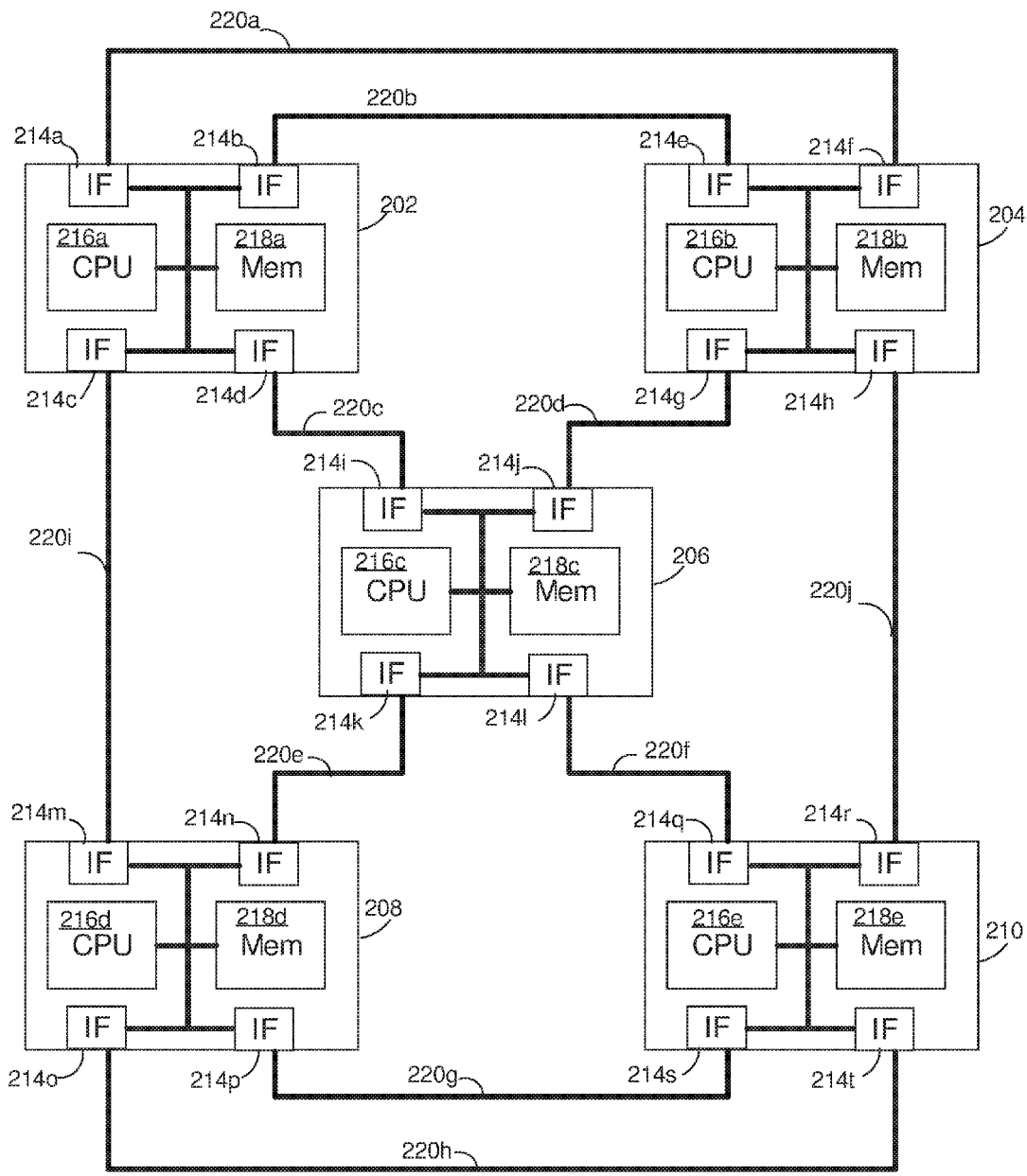
FIG. 2 depicts a switched fabric architecture.
Figure 3:
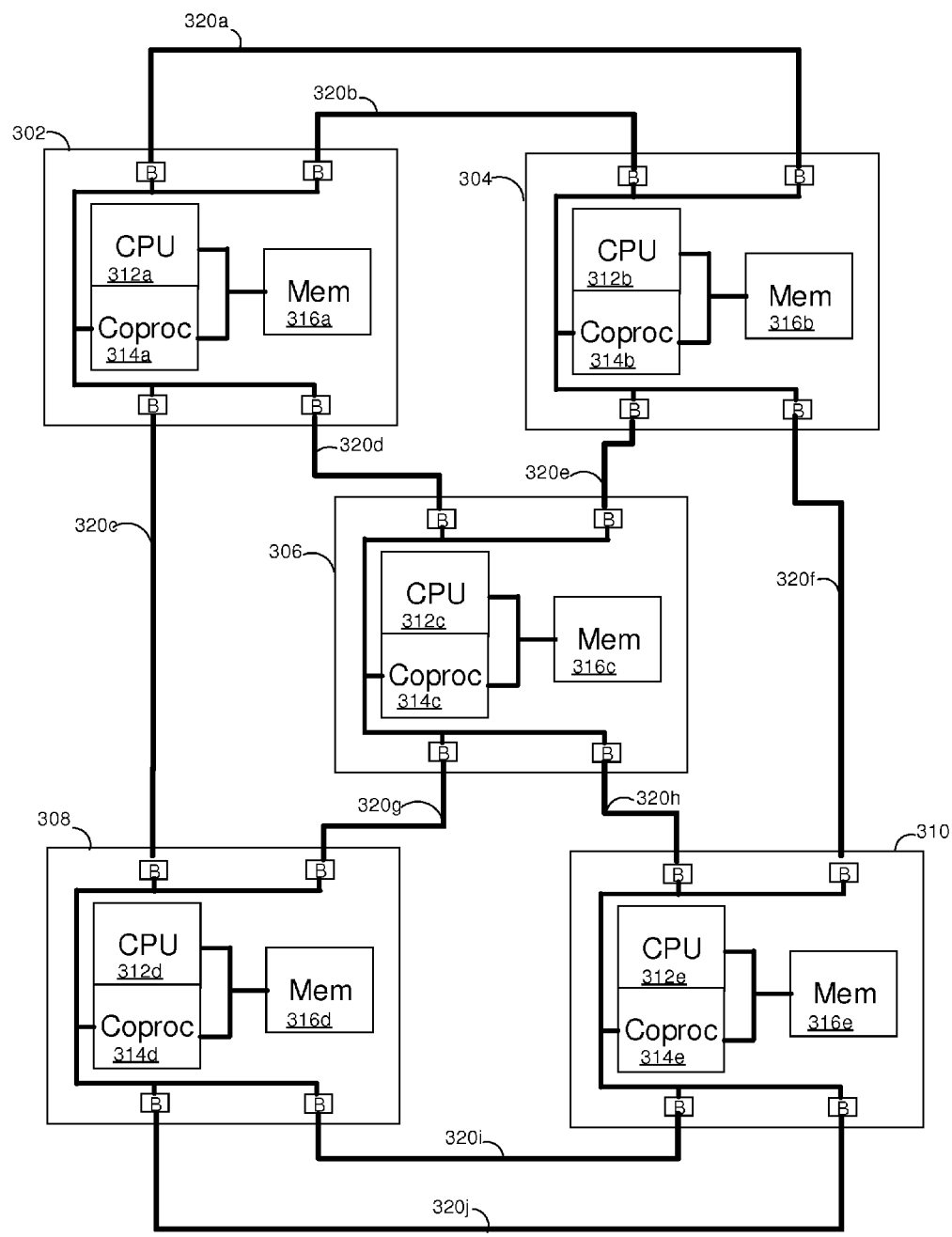
FIG. 3 depicts a cluster in which an embodiment operates.

FIG. 3 depicts an example cluster in which an embodiment operates. Each node 302, 304, 306, 308, 310 in the cluster includes a main CPU 312a-e, a coprocessor 314a-e and a memory 316a-e. The figure shows a single CPU and a single coprocessor in each node to simplify the drawing; in reality, a node usually contains many CPUs and each CPU usually contains many coprocessors. Each coprocessor 314a-e interfaces directly with the point-to-point links 320a-j and is directly coupled to the respective node's physical memory 316a-e. As used herein, the term coprocessor refers to a distinct processing entity, but not necessarily a distinct physical device separate from CPU or other processor. For example, the coprocessor can be a core in the CPU. Advantageously, as the number of CPUs in the cluster increases, the number of coprocessors and addressable memory in the node increase as well. This provides the benefit that the node maintains its performance, especially performance related to communication over the links, as the number of CPUs in the node increases. The only limitation is the bandwidth of the point-to-point connections between the nodes. Higher speed connections or more connections can mitigate this limitation.

Node Architecture and Coprocessor Interfaces

Figure 4A:
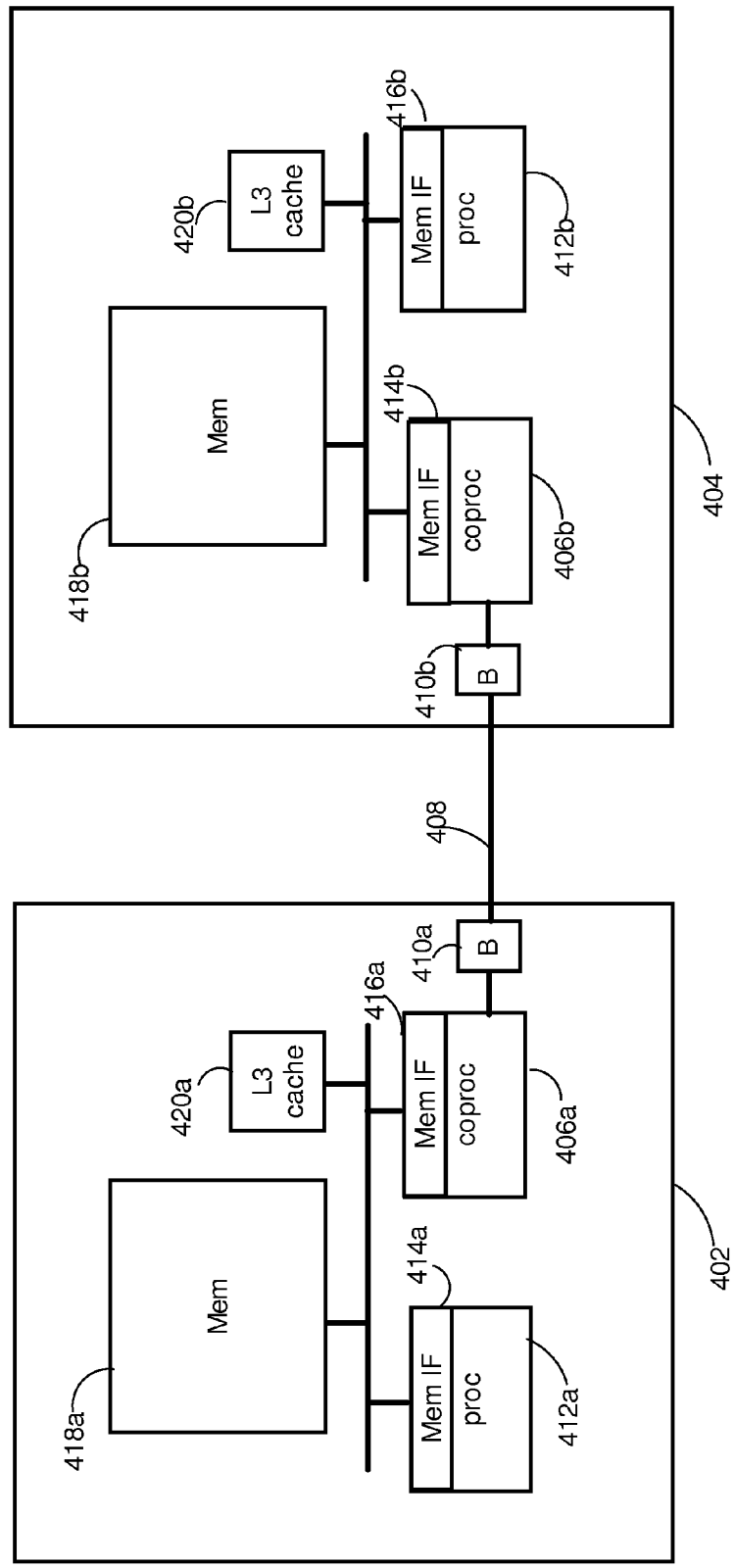
FIG. 4A depicts a pair of nodes in the cluster of FIG. 3.

FIG. 4A depicts an example pair of nodes 402, 404 in the cluster of FIG. 3. The pair of nodes and the connection between them is simplified in FIG. 4A; in practice, for reliability reasons, each node connects to self-redundant switches via multiple links, so that a system maintain operation even with multiple link failures or a switch failure. The coprocessors 406a-b respectively in each node 402 404 are interconnected by high-speed point-to-point link 408, buffered on each end by buffers 410a, 410b. The main processor 412a-b (in reality, many multi-core CPUs) and coprocessor 406a-b (in reality, many coprocessors) of each node 402, 404 each include a memory interface 414a-b, 416a-b to respective physical memories 418a-b in each node 402, 404. If the main processor 412a-b has an L3 cache 420a, b, the coprocessor 406a, b has access to that cache so that it can update its contents. In that case, cache coherency protocols maintain coherence between the main memory 418a, b and any other L3 caches that are present. Alternatively, if the coprocessor 406a, b directly updates main memory, cache coherency protocols maintain coherency between any L3 cache present 420a, b and the main memory 418a, b. The physical memory interface 416a-b of each coprocessor 406a-b provides access to a hypervisor interface and a user interface as described below, both of which reside in the physical memory 418a-b.

Figure 4B:
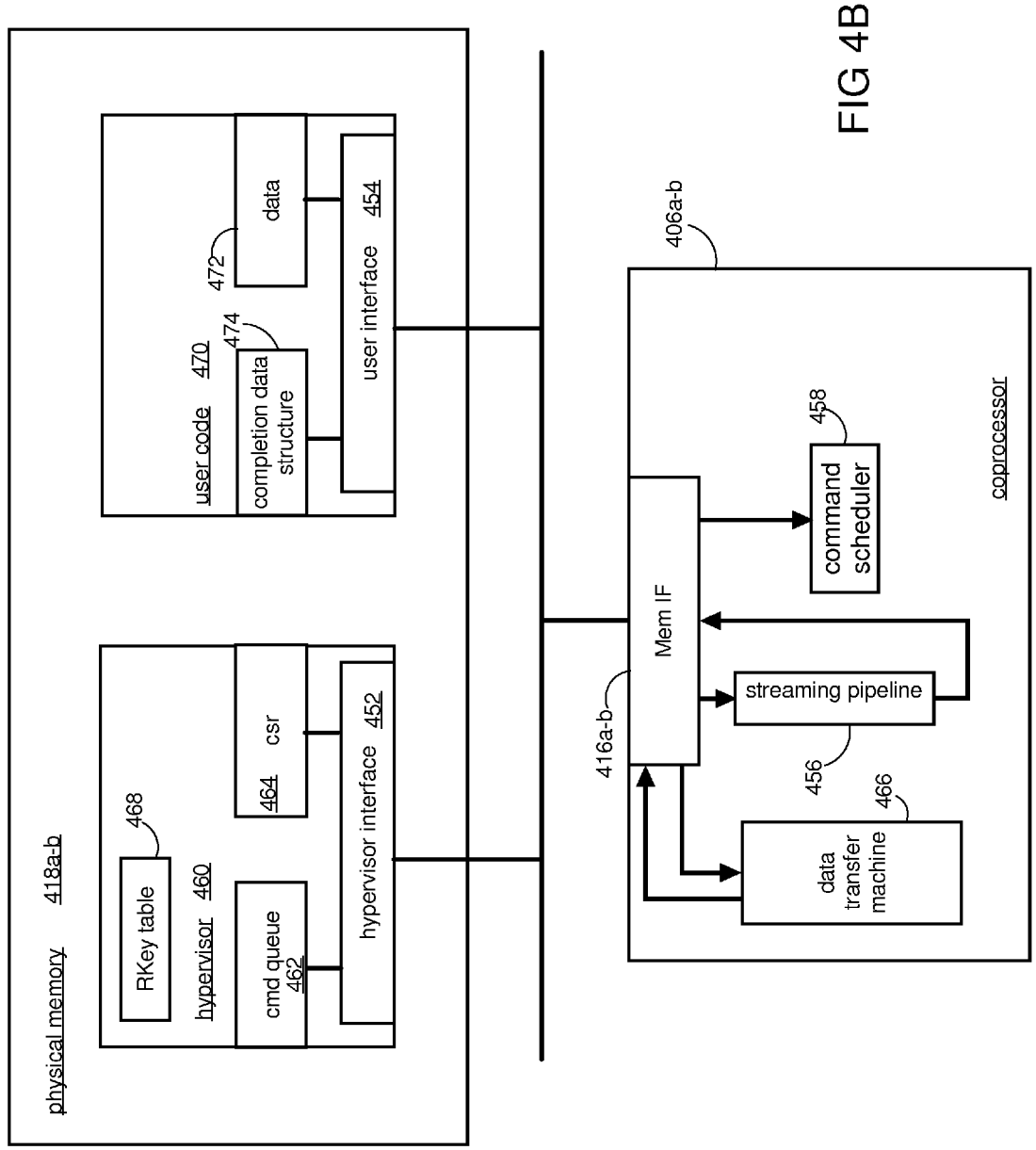
FIG. 4B depicts the coprocessor and its interfaces.

FIG. 4B depicts the coprocessor 406a-b and its interfaces 416a-b, 452, 454. The coprocessor 406a-b includes a memory interface 416a-b, a streaming pipeline 456, which processes coprocessor commands, a command scheduler 458, which schedules commands in the coprocessor pipeline 456, and a data transfer machine 466, which moves data within a physical domain or among physical domains according to a data movement command issued to the coprocessor.

The memory interface 416a-b couples the coprocessor 406a-b to a hypervisor interface 452 and to a user interface 454, both of which reside in physical memory 418a-b.

The data transfer machine 466 in the coprocessor 406a-b is coupled to the physical memory 418a-b through the memory interface 416a-b and performs data transfers from or to any physical link to which the coprocessor 406a-b is coupled and the physical memory 418a-b without involving the processor 412a-b in the node.

Hypervisor Interface

The hypervisor interface 452 of a particular node depicted in FIG. 4B supports a multi-threaded software hypervisor 460, which is a special multi-threaded driver that provides an API interface between the operating system (OS), which runs on the main CPU in the node, and/or user code and the coprocessor, thereby providing secure access to the coprocessor. The hypervisor issues commands to the coprocessor 406a-b over the hypervisor interface 452 and includes command queues 462, status registers csr 464 for the coprocessor 406a-b, and an RKey table 468, which the coprocessor uses to validate RKeys and look up their associated physical addresses, where an RKey is a certificate that grants access rights to a physical memory of a remote node, i.e., one connected through a point-to-point link to the node in FIG. 4B. Because RKey tables and therefore the number of RKeys increase with the number of nodes without the addition of any hardware, the scalability of the cluster is limited only by the bandwidth of the communications links between nodes.

The command queues 462 contain commands, each in the form of a coprocessor control block (CCB) described below. In one embodiment, the command queues 462 are circular queues (also known as ring buffers) and contain a maximum of 16 entries. In one embodiment, a coprocessor 406a-b supports eight command queues and one priority queue for the streaming pipeline 456.

The coprocessor status registers csr 464 provide information for configuring the coprocessor 406a-b and for synchronizing the coprocessor 406a-b. The hypervisor 460 has access to one or more of the internal coprocessor status registers csr 464, such as the doorbell register, which the hypervisor 460 uses to synchronize the issuance of commands to the coprocessor 406a-b, and status registers to configure the coprocessor 406a-b at startup and to read error logs and status.

User Interface

The user interface 454 supports user code area 470, which provides one or more data areas 472 for data movement commands and a completion data structure 474 for command results. The completion data structure 474 is a common area assigned by the hypervisor managing the coprocessor. The location of the common area is communicated to the OS and is visible to all software that has access to the area. Each data area 472 used by the coprocessor 406a-b for input and output data is accessible for data transfers by any of the coprocessors present in the physical domain, and resides permanently (i.e., is immune from being paged or swapped out of physical memory) in a physically contiguous area of memory 418a-b. Input and output data areas for remote nodes require an RKey to be accessed.

The coprocessor updates the completion data structure 474 at the end of a command to resynchronize with the hypervisor 460, which has access to the completion data structure 474. The completion data structure 474 is used for the following functions, signaling completion to the user, transmitting the command return value to the user, establishing flow control with the user, signaling user visible errors, logging user visible command statistics.

Streaming Pipeline

The streaming pipeline 456 is multi-threaded and executes commands to move data from one memory location to another memory location. Either the source or destination or both may be non-local, i.e., in a remote node. The streaming pipeline also assists other remote streaming pipelines in moving data.

Command Scheduler

The command scheduler 458 schedules commands for the available threads of the streaming pipeline 456 assuming that the commands will be executed in parallel. In one embodiment, serializing flags cause two commands to be executed sequentially.

Physical Domains

Each node 402, 404 in FIG. 4A operates in a separate physical domain, which is an isolated and distinct address space that only the local processor and coprocessor have permission to access. Thus, operations and address spaces in the node are isolated from other nodes. The physical point-to-point link 408 provides the communication mechanism between the physical domains, so that the cluster can operate as an integrated unit.

Figure 5:
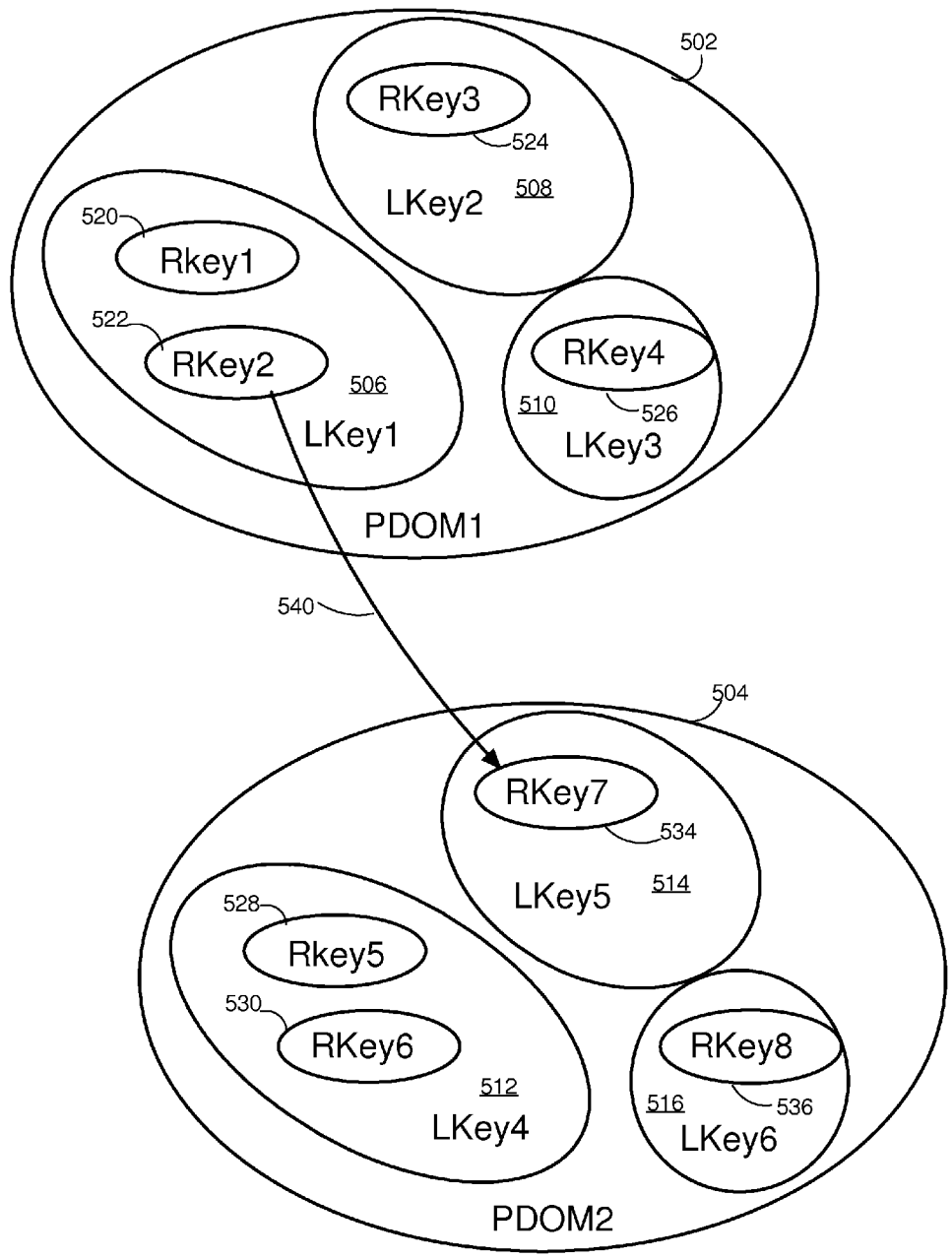
FIG. 5 depicts a model for the address spaces among the nodes.

FIG. 5 depicts a model for the address spaces among the nodes. Included in the figure are two example physical domains, PDOM1 502 and PDOM2 504, though the number of physical domains is the same as the number of nodes in the cluster. Each physical domain 502, 504 includes multiple local keys (LKeys) 506, 508, 510, which are keys that provide access rights to a unique physical address space local to the physical domain. Local keys are associated with large physically contiguous portions of the physical address space of a physical domain and are allocated for user processes that are local to the physical domain. In FIG. 5, PDOM1 has local keys LKey1 506, LKey2 508, LKey3 510. PDOM2 504 has local keys LKey4 512, LKey5 514, LKey6 516.

A remote key (RKey) is associated with a window of a memory region that has an LKey. Each LKey can include one or more RKeys and associated memory regions. The RKey grants remote access rights from one given local key in a physical domain to another local key in a remote physical domain. The remote user of a portion of memory protected by an RKey presents the RKey to access that portion of memory. The coprocessor, upon receiving the RKey, validates the key and if the validation succeeds, proceeds with the command. FIG. 5 depicts LKey1 506 in PDOM1 as including RKey1 520 and RKey2 522. LKey2 508 includes RKey3 524 and LKey3 510 includes RKey4 526. In PDOM2 504, LKey4 512 includes RKey5 528 and RKey6 530, while LKey5 514 includes RKey7 534 and LKey6 516 includes RKey8 536. FIG. 5 additionally depicts a request 540 between a region covered by RKey2 522 in PDOM1 502 and the region covered by RKey7 534 in PDOM2 504.

In one embodiment, an RKey includes the following data items.

RKey={Hash,Size,PA,SecretNo,Flags}, where
Hash={Encrypt(Size,Flags,Address,SecretNo)}; Encrypt could be any of the popular and fast encryption schemes; PA is the physical address associated with the RKey; Size is the size of the region in which the RKey is valid; Address contains the physical address in the remote physical domain; SecretNo is one of sixteen numbers used to generate the Hash; and Flags indicate whether the memory region is readable, writable, or a cache update.

In one embodiment, an RKey can cover a memory region as small as 1 KB or as large 1 TB, as specified in the Size field.

Key Setup

A centralized configuration program in the cluster oversees the set up of all source and destination keys needed for the operation of the cluster. At initialization time, the centralized configuration program sends to the hypervisor in each node, a command that specifies an LKey, an RKey, which resides in the LKey, the size of the region that the RKey covers, and the access mode that specifies readable or writeable, or cache update. Upon receiving the user command, the hypervisor creates the RKey, performs encryption to create the hash, and populates the RKey table in the physical memory of the node in which the hypervisor operates. The node that owns the memory containing a particular RKey table is called the "home node" for the keys in the table. A "home node" sends its RKeys to other nodes through the network so that the node can participate in data transfers. In operation, the RKey table in its home node is used by the coprocessor in the home node to validate a received RKey and to translate the RKey to a physical address.

In one embodiment, an RKey is created by the command rkey_create (lkey, off, len, ttl, mode), where lkey is the LKey that contains the newly created RKey, off is an offset into the RKey table for translation, len is the size of the newly created regions, ttl is the time to live parameter, and mode is the read or write access mode. The time to live parameter ttl limits the life of the key for added security. After a key expires, rights granted to the region covered by the RKey are revoked and access to the same region requires a new key. Not only does the time to live parameter help maintain security, the RKey table itself also does. In particular, to secure a node from receiving outside transfers, the node can invalidate its own RKey table. The invalidated table causes all transfers to the node with such a table to fail validation. Each attempted transfer receives a negative acknowledgment indicating that the validation failed.

Coprocessor Command Queue Operation

The coprocessor operates in the physical address space so that any commands sent to the coprocessor contain only physical addresses. All data structures visible to the coprocessor reside in contiguous physical locations and are expected to stay resident in memory (i.e., not be swapped or paged out).

Figure 6:
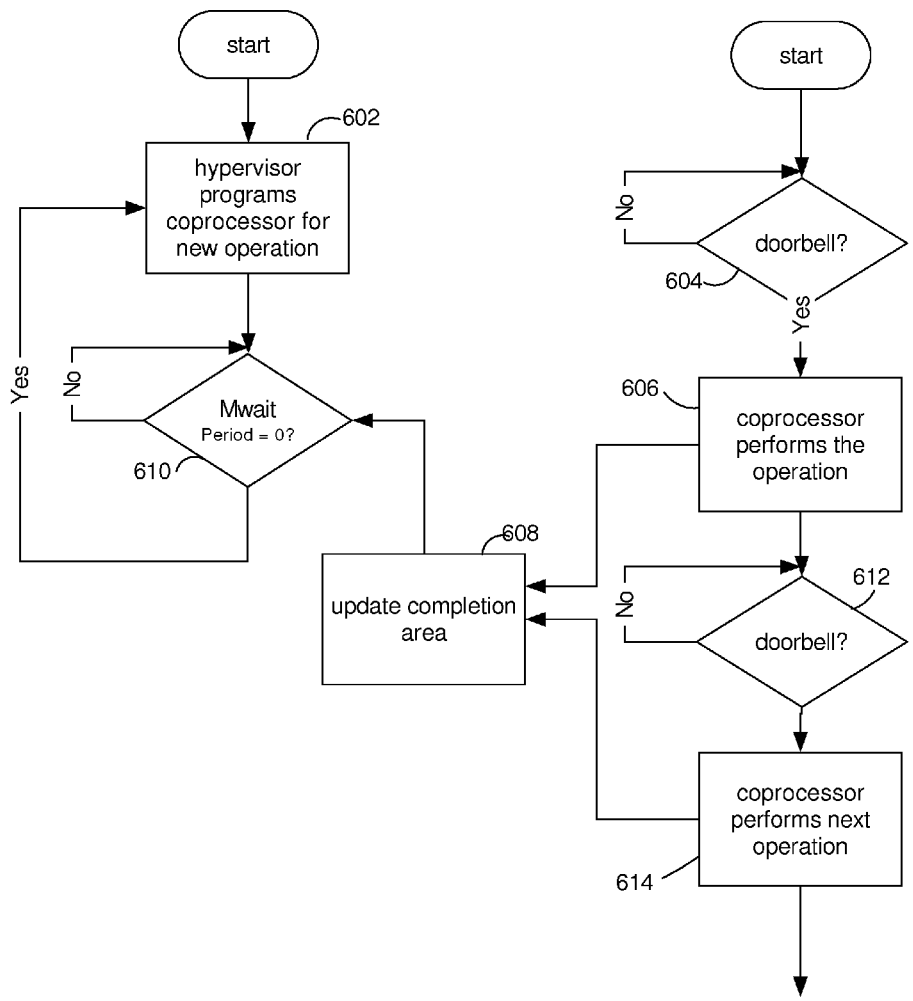
FIG. 6 depicts synchronization between a hypervisor and a coprocessor.

FIG. 6 depicts synchronization between a hypervisor and a coprocessor. When the hypervisor writes a command into a command queue as in step 602, it writes to a coprocessor "doorbell" register, one of the coprocessor status registers. The write to the doorbell register, an attention getting device for the coprocessor, increments a pointer to the head of the command queue, informing the coprocessor of the presence of a new command in the command queue, as in step 604. If the command queue was empty when the doorbell register was written, the coprocessor executes the new command, as in step 606. However, with multiple commands in the queue, the coprocessor can execute commands in any order, unless constrained by a serializing flag. Commands in a priority queue are generally executed before commands in a non-priority queue. After the coprocessor executes a command, it updates the completion area, as in step 608, which informs the hypervisor that the command was completed, as in step 610, and that the queue has an empty slot for a new command, as in step 602. If the doorbell register is again written, as determined in step 612, then the coprocessor performs the next command and updates the completion area in step 608 when the command is completed. When the coprocessor detects that the command queue is empty, it shuts down waiting for the doorbell register to be written. External requests are still processed.

Coprocessor Command Execution

When the coprocessor receives a command from the hypervisor, it executes the command asynchronously with the thread in the multi-threaded hypervisor that issued the command. If the hypervisor sends multiple commands, the coprocessor schedules them to be executed in round-robin fashion. The coprocessor can execute some commands in parallel.

Figure 7:
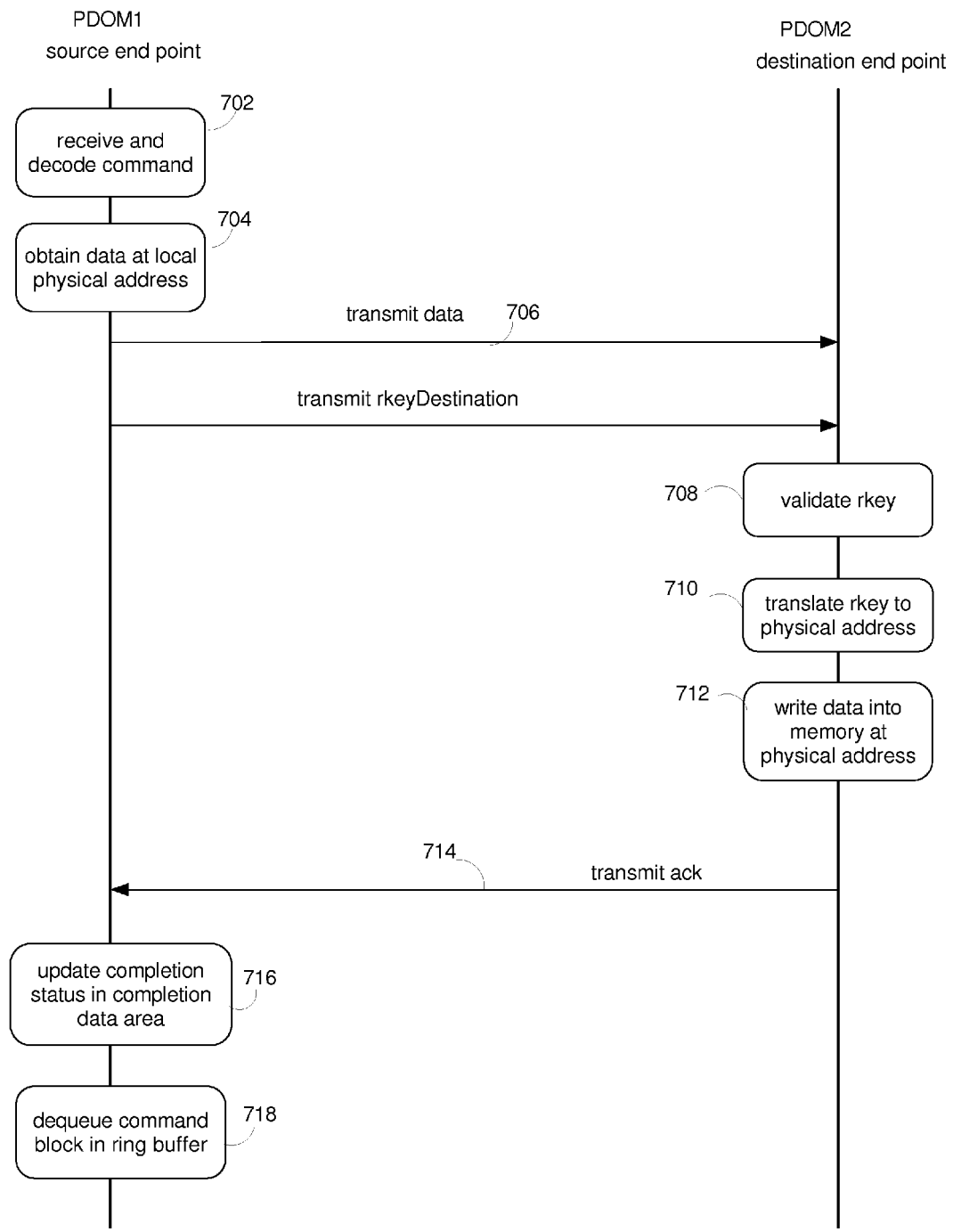
FIG. 7 depicts a command operation between a local node and a remote node.

FIG. 7 depicts a command operation between a local node and a remote node. In the figure, the coprocessor in PDOM1 receives and decodes a new command in step 702. In step 704, it obtains data at a local physical address and in step 706 transmits data to memory in PDOM2 along with an RKey. The coprocessor in PDOM2 validates the RKey using the hash, in step 708, in the key. If the validation is successful, the coprocessor translates the RKey to its physical address in step 710 and writes the transmitted data to the physical memory associated with the RKey in step 712. If the RKey validation is not successful, the request is dropped after an error notification is sent back to the requester. After the data is written, the coprocessor in PDOM2 sends, in step 714, an acknowledgment back to the coprocessor in PDOM1, which, upon receipt of the acknowledgment, updates, in step 716, the completion status in the command block and dequeues, in step 718, the command block in the ring buffer. Because the coprocessor in PDOM2, the final destination, delivers the acknowledgement (negative or positive), the sender PDOM, PDOM1 in this case, knows that the data was actually delivered to the final destination. This means that if the final destination in PDOM2 is a persistent memory, such as any non-volatile memory, the sender knows from a positive acknowledgment from PDOM2, that the data resides in the persistent memory and not in a buffer or cache waiting to be written to the persistent memory.

Figure 8:
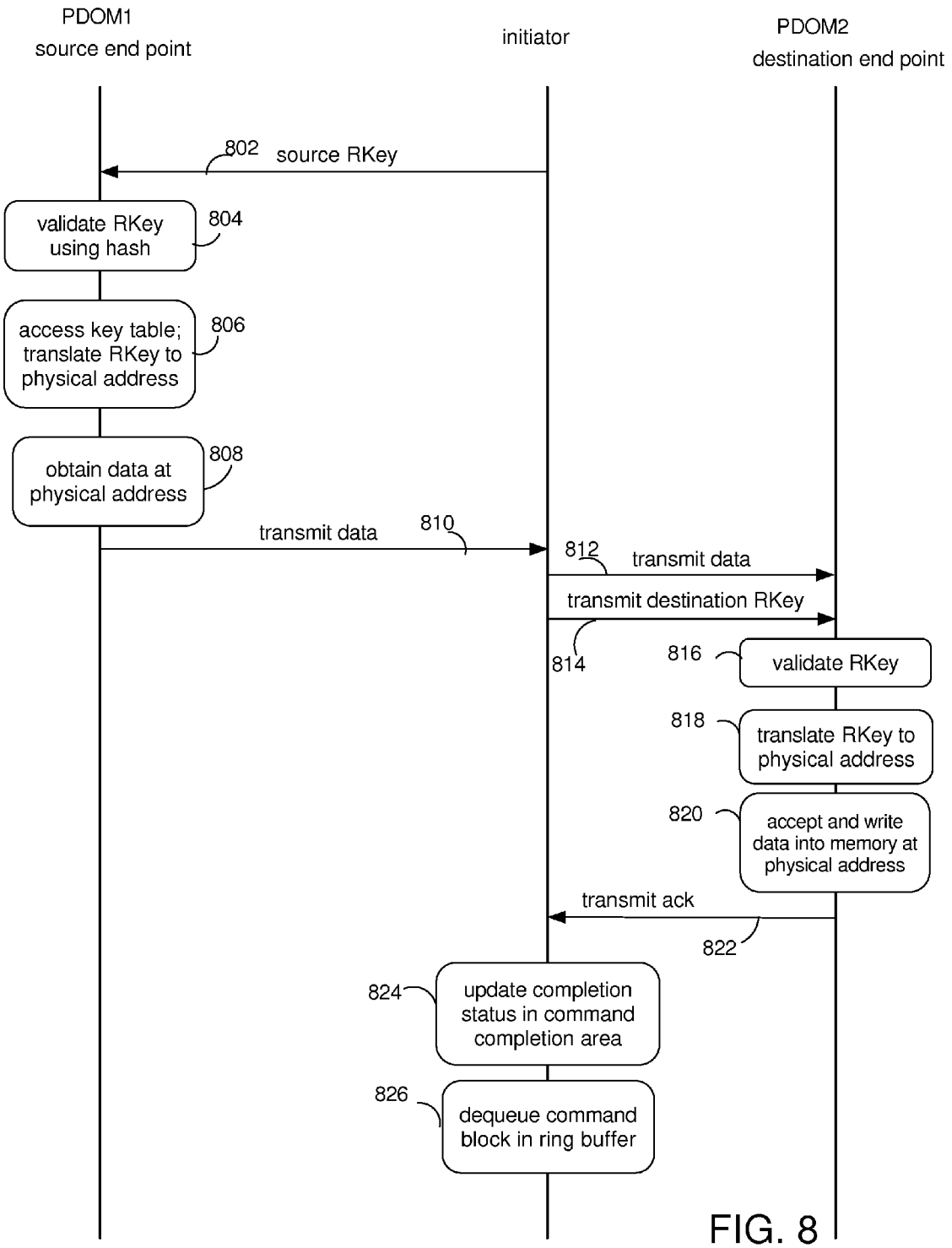
FIG. 8 depicts a command operation between two remote nodes.

FIG. 8 depicts a command operation between two remote nodes with the request coming from an initiator node, i.e., a node different from the two remote nodes. In the figure, the coprocessor in PDOM1 at the source endpoint receives a command, in step 802, from an initiator to transfer data from PDOM1 to a destination endpoint in PDOM2. Because the initiator is neither PDOM1 nor PDOM2, the request specifies a transfer from a source RKey to a destination RKey. The coprocessor at the source endpoint, upon receiving the source RKey, in step 802 validates the source RKey in step 804 using the hash in the key. It then accesses the local key table, in step 806, to obtain the key's associated physical address, after which it obtains the requested data in step 808. The coprocessor then transmits the obtained data, in step 810, to the initiator, which forwards the data in step 812 along with the destination RKey in step 814, to the destination endpoint in PDOM2. The coprocessor at the destination endpoint in PDOM2 validates the destination RKey, in step 816, and if successful, looks up the key's associated physical address in PDOM2, in step 818. PDOM2 accepts the data and writes the data, in step 820, to the physical addresses specified by the RKey and command. When all of the data is written to the physical memory in PDOM2, the coprocessor at the destination endpoint in PDOM2 transmits an acknowledgment back to the initiator, in step 822, which updates the completion status, in step 824, in the command block and dequeues, in step 826, the command block from the ring buffer. In the case in which the destination endpoint is persistent address space, such as a space for any non-volatile memory, the acknowledgment guarantees that the data resides in the persistent address space.

In an alternative embodiment, the initiator sends the destination RKey, with a forwarding instruction, to the source endpoint in PDOM 1. The source endpoint still validates the source RKey and uses the validated source RKey to access the requested data, as in steps 804, 806, and 808 of FIG. 8. The source endpoint in PDOM1 then sends the data from itself directly to the destination endpoint in PDOM 2 along with the destination RKey, which the source endpoint was instructed to forward. In this embodiment, the source receives an acknowledgment from the destination and forwards the received acknowledgment to the initiator.

Coprocessor Commands

A coprocessor supports a variety of data movement and maintenance commands. The data movement commands include copy type, fill type, store type, compare type, and modify type commands.

The copy type commands move data from a source address to a destination address or immediate data to the destination address. If the source or destination address is not local, then an RKey specifies the destination address. When the command completes it posts a result in the completion data structure.

The fill type commands take an immediate data value and use it to fill the data value starting at a destination address. If the destination address is not local, then an RKey specifies the destination address.

The store type commands take an immediate data value and store it in the destination address. If the destination is not local, then an RKey specifies the destination address.

Compare type commands take a compare value and a swap value. The command compares contents at a destination address with the compare value. If the two are equal, then the command writes the swap value into the destination contents and returns the old contents of the destination. If the destination is not local, then an RKey specifies the destination address.

Another type of compare command takes an immediate value and compare value, and compares the compare value with the destination contents. If the compare value is strictly larger, then the command updates the destination contents with the immediate value and returns the old contents of the destination. If the destination is not local, then an RKey specifies the destination address.

The modify type commands take an immediate value and add the value to or OR the value with the contents of a destination address and return the old contents of the destination. If the destination is not local, then an RKey specifies the destination address.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
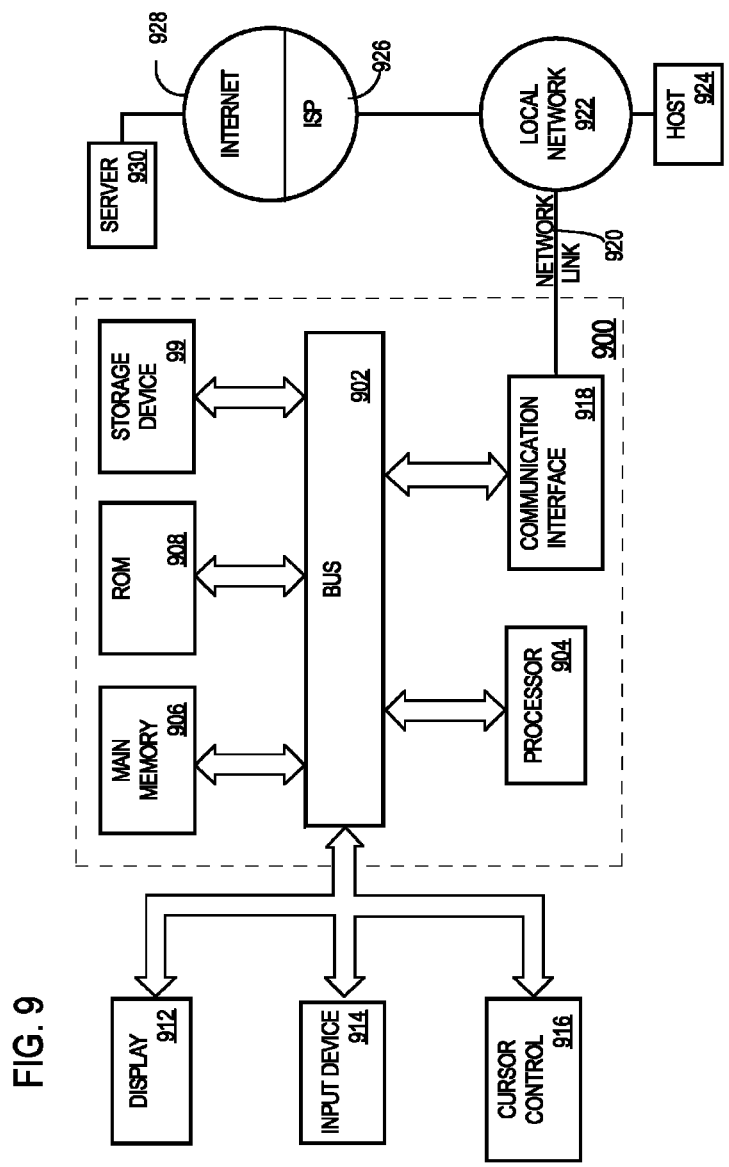
FIG. 9 is an example computer system.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   a plurality of computing nodes, wherein each computing node of the plurality of computing nodes includes one or more coprocessors, one or more central processing units (CPUs), and a memory directly coupled to the one or more coprocessors,
wherein each memory of said each computing node resides in a separate and distinct physical domain;
a plurality of point-to-point physical communications links coupling the plurality of computing nodes,
wherein the one or more coprocessors of said each computing node interface directly with the one or more communications links to transfer data over the plurality of point-to-point physical communications link without involving the one or more CPUs of said each computing node,
wherein a particular coprocessor of a particular node is configured to transfer data between the memory coupled to the particular coprocessor at the particular node and a first remote memory of a first remote node over the one or more communications links, without involving the one or more CPUs, using a first certificate that grants access to a portion of the memory in the first remote node,
wherein the particular node is a destination node for the data transfer, the destination node including a persistent address space,
wherein the destination node transmits an acknowledgment indicating that the transferred data resides in the persistent address space.

2. The system of claim 1, wherein the particular coprocessor further includes a data transfer machine that moves data from one memory location to another memory location.

3. The system of claim 1, wherein each certificate is a remote key (RKey) owned by a node of the plurality of computing nodes.

4. The system of claim 3,
wherein each node of the plurality of computing nodes has a software hypervisor running on said each node; and
wherein the one or more coprocessors of said each node operates under control of the software hypervisor.

5. The system of claim 4, wherein each software hypervisor of the one or more coprocessors of said each node maintains a key table in the memory of said each node that maps RKeys to physical addresses of the memory of said each node.

6. The system of claim 3,
wherein each RKey includes a hash field for validating the RKey; and
wherein the coprocessors of the plurality of computing nodes validate any RKey that is received using the hash field in the RKey.

7. The system of claim 3, wherein each RKey expires after a specified time, an expired RKey revoking access rights that the RKey granted.

8. The system of claim 1,
wherein each node of the plurality of computing nodes has a software hypervisor running on said each node;
wherein the one or more coprocessors in each node transfers data in response to a command issued by the software hypervisor; and
wherein the command is part of a control block that includes
a control word that includes a size of the data transfer, and
a completion address that specifies a location at which completion data of a transfer is to be posted in the memory coupled to the one or more coprocessors.

9. The system of claim 3, wherein the first remote node is further configured to invalidate its own RKey table, causing validation of the first certificate to fail.

10. A method of transferring data between nodes in a cluster, the method comprising:
receiving and decoding by a coprocessor of a local node a command for a data transfer without involving a CPU of the local node;
determining from the decoded command that the data transfer has a source location in the local node and a destination location in a remote node distinct from the local node, the local node and the remote node being coupled to each other by one or more point-to-point communication links, wherein the coprocessor and a remote coprocessor of the remote node each interface directly with the one or more point-to-point communication links, wherein the remote node is a destination node that includes a persistent address space;
obtaining a certificate granting rights to transfer data to the remote node,
transferring the certificate from the local node to the remote node,
wherein the certificate is successfully validated in the remote node by the remote coprocessor without involving a CPU of the remote node;
transferring data from the local node to the remote node, after successful hardware authentication of the certificate by the remote coprocessor, without involving a CPU of the remote node or a CPU or the local node;
receiving an acknowledgement from the remote node that indicates that the transferred data resides in the persistent address space; and
updating a completion status indicating the command was successful.

11. The method of claim 10, wherein the certificate is an RKey owned by the remote node.

12. The method of claim 11,
wherein the RKey includes a hash field to facilitate validation of the RKey; and
wherein the remote nodes validate the RKey that is received using the hash field in the RKey.

13. The method of claim 11,
wherein the remote node includes a memory; and
wherein the remote node maintains a key table that maps any received RKey to physical addresses in the memory.

14. A method of transferring data between nodes in a cluster, the method comprising:
receiving and decoding by coprocessor of a local node a command for a data transfer without involving a corresponding CPU of the local node;
determining from the decoded command that the data transfer has a source location in a first remote node and a destination location in a second remote node that is destination node containing a persistent address space, each remote node being distinct from each other and the local node and being coupled to the local node by one or more point-to-point communication links;
wherein the coprocessor of the local node and a coprocessor of the first remote node interface directly with the one or more point-to-point communication links, wherein the command for the data transfer is received over the one or more point-to-point communication links from the coprocessor of the first remote node;
obtaining a first certificate and a second certificate granting rights to transfer data between the first remote node and second remote node,
transferring the first and second certificates from the local node to the first and second remote nodes, wherein hardware authentication of the first certificate is performed by a first coprocessor of the first remote node without involving a corresponding CPU of the first remote node, wherein hardware authentication of the second certificate is performed by a second coprocessor of the second remote node without involving a corresponding CPU of the second remote node;

after successful hardware authentication, transferring data from the first remote node to the second remote node without involving a corresponding CPU of the local node;

receiving an acknowledgement from the second remote node that indicates that the transferred data resides in the persistent address space; and updating a completion status indicating the command was successful.

15. The method of claim 14, wherein the first certificate is a first RKey owned by the first remote node and the second certificate is a second RKey owned by the second remote node.

16. The method of claim 15,
wherein the first RKey and the second RKey each includes a hash field to facilitate validation of the RKey; and
wherein the first RKey and the second RKey are validated using the hash field in the RKey.

17. The method of claim 15,
wherein each of the remote nodes includes a memory; and
wherein each of the remote nodes maintains a key table that maps any received RKey to physical addresses in the memories of the respective remote nodes.

* * * * *